(12) United States Patent
Pencak

(10) Patent No.: US 6,296,726 B1
(45) Date of Patent: Oct. 2, 2001

(54) METHOD AND APPARATUS FOR SPIN WELDING CONTAINER CLOSURES

(75) Inventor: John Pencak, Huntington, CT (US)

(73) Assignee: Silgan Containers Corporation, Woodland Hills, CA (US)

( * ) Notice: Subject to any disclaimer, the term of this patent is extended or adjusted under 35 U.S.C. 154(b) by 0 days.

(21) Appl. No.: 09/593,064

(22) Filed: Jun. 13, 2000

(51) Int. Cl.⁷ .................................................. B29C 65/06
(52) U.S. Cl. ........................ 156/64; 156/69; 156/73.5; 156/580; 53/334; 53/485
(58) Field of Search ............................. 156/64, 69, 73.5, 156/292, 580; 53/334, 485

(56) References Cited

U.S. PATENT DOCUMENTS

| | | |
|---|---|---|
| Re. 29,448 | 10/1977 | Brown et al. . |
| 3,120,570 | 2/1964 | Kennedy et al. . |
| 3,297,504 | 1/1967 | Brown et al. . |
| 3,385,741 | 5/1968 | Allen . |
| 3,499,068 | 3/1970 | Brown . |
| 3,542,274 | 11/1970 | Miller . |
| 3,542,275 | 11/1970 | Loyd et al. . |
| 3,562,073 | 2/1971 | Kibler . |
| 3,715,895 | 2/1973 | Devlin . |
| 3,750,927 | 8/1973 | Miller et al. . |
| 3,800,400 | 4/1974 | Mistarz et al. . |
| 3,824,145 | 7/1974 | Flax . |
| 3,934,780 | 1/1976 | Flax . |
| 3,973,715 | 8/1976 | Rust . |
| 3,993,519 | 11/1976 | Birkhold . |
| 4,212,409 | 7/1980 | Jeppsson . |
| 4,239,575 | 12/1980 | Leatherman . |
| 4,247,346 | 1/1981 | Maehara et al. . |
| 4,333,585 | 6/1982 | Del Bon . |
| 4,466,565 | 8/1984 | Miyazima . |
| 4,469,547 | 9/1984 | Mitchell et al. . |
| 4,470,514 | 9/1984 | Dronet . |
| 4,513,876 | 4/1985 | Buchner . |
| 4,533,063 | 8/1985 | Buchner et al. . |
| 4,534,751 | 8/1985 | Fortuna et al. . |
| 4,548,333 | 10/1985 | Kobayashi et al. . |
| 4,693,390 | 9/1987 | Hekal . |
| 4,712,706 | 12/1987 | Nakata et al. . |
| 4,721,546 | 1/1988 | Clark et al. . |
| 4,735,336 | 4/1988 | Buchner et al. . |
| 4,758,392 | 7/1988 | Collins et al. . |
| 4,784,709 | * 11/1988 | Unger et al. .............................. 156/69 |
| 4,892,227 | 1/1990 | MacLaughlin . |
| 5,064,485 | 11/1991 | Smith et al. . |
| 5,137,166 | * 8/1992 | Unger et al. .......................... 220/613 |
| 5,276,616 | 1/1994 | Lurie . |
| 5,647,950 | 7/1997 | Reed et al. . |
| 5,741,395 | 4/1998 | Mozelack et al. . |
| 5,772,103 | 6/1998 | Hofius et al. . |
| 5,833,127 | 11/1998 | Powell et al. . |

FOREIGN PATENT DOCUMENTS

| | | |
|---|---|---|
| 2120200 | 11/1983 | (GB) . |
| 2217254 | 10/1989 | (GB) . |
| 2259885 | 3/1993 | (GB) . |
| 62-41021 | 2/1987 | (JP) . |

\* cited by examiner

*Primary Examiner*—James Sells
(74) *Attorney, Agent, or Firm*—Pepe & Hazard, LLP

(57) ABSTRACT

Sealed synthetic resin containers are spin welded by bringing opposed, generally complimentary horizontal mating surfaces of the lid and bowl into contact under a predetermined axial pressure and rapidly accelerating rotation of the lid relative to the bowl while maintaining substantially the axial pressure to produce melting of the mating surfaces until a desired torque value is attained. Thereafter, the rotation of the lid is immediately decelerated to terminate the rotation and allow the mating surfaces to bond. Generally, the torque is monitored repeatedly during the accelerating rotation until a plateau is reached and the accelerating step is continued for at least 50 milliseconds thereafter.

18 Claims, 13 Drawing Sheets

METHOD AND APPARATUS FOR SPIN WELDING CONTAINER CLOSURES

BACKGROUND OF THE INVENTION

The present invention relates to the sealing of plastic lids or closures to plastic containers and, more particularly, to the spin welding of lids and containers.

The process of spin welding is one in which the friction between relatively rotating lids and containers such as bowls and cups causes the synthetic resin at abutting surfaces to melt and bond the two surfaces upon cooling. Generally, many spin welding processes have involved spinning the lid or cover at a relatively high speed and then bringing it into contact with the container which produces the melting friction as the lid rotation is slowed and then stops. Exemplary of such a process is U.S. Pat. No. 3,297,504 to Brown et al.

The industry has been seeking ever shorter spin welding cycles to expedite the filling and sealing process, while obtaining a reliable weld over the entire circumference to ensure a good seal.

Hofuis et al U.S. Pat. No. 5,772,103 describes an alternate process in which the lid and container are first brought into contact under vertical load and then rotational force is applied for a preset small number of rotations to effect the desired fusion.

In any spin welding process, there is a problem in dealing with variables such as variations in surface characteristics and configuration, contamination of the abutting surfaces by the contents of the container during filling, etc.

Accordingly, it is an object of the present invention to provide a novel method of spin welding lids and containers which will accommodate surface variations and produce well sealed containers.

It is also an object to provide such a method which may be practiced easily and rapidly in high speed filling lines.

Another object is to provide novel apparatus for spin welding lids and containers which accommodates surface variations and produces well sealed containers.

SUMMARY OF THE INVENTION

It has now been found that the foregoing and related objects may be readily attained in a method of making sealed synthetic resin containers which comprises molding thermoplastic synthetic resin into bowls and lids which have substantially complimentary mating surfaces extending about the periphery thereof. One of the bowls is filled with product, and the opposed, generally horizontal mating surfaces of the lid and bowl are brought into contact under a predetermined axial pressure while gripping the bowl and lid securely. The lid is rotated to the bowl with rapidly accelerating rotation while maintaining substantially the axial pressure to produce melting of the mating surfaces until a desired torque value is attained. The rotation of the lid is then immediately decelerated to terminate the rotation and allow the mating surfaces to bond.

The rotation is effected at a high degree of acceleration and the termination of rotation is effected at a high degree of deceleration. The torque is monitored repeatedly during the step of accelerating rotation until a plateau is reached, and the rotation is continued for at least 50 milliseconds thereafter. The monitoring of the torque is conveniently effected by monitoring the power being drawn by a motor used for producing the accelerating rotation.

The predetermined axial pressure is preferably 200–500 p.s.i., and the acceleration and termination of rotation is effected in less than four relative rotations of the lid relative to the bowl. Both the acceleration and deceleration are at a rate of 35,000–250,000 rpm/sec.

Desirably, there is included the step of directing steam onto the mating surface of the bowl prior to bringing the lid into contact therewith, and nitrogen is preferably admixed with the steam. As a result, a partial vacuum is produced in the sealed container.

The apparatus for producing the spin welded containers comprises a holder for firmly gripping a bowl, a holder for firmly gripping a complimentary lid, and means for moving the holders relative to each other to bring mating surfaces into contact. Pressure applying means is provided to apply predetermined axial pressure on the abutting surfaces, and acceleration and deceleration means is provided for rapidly accelerating rotation of the holders relative to each other and for rapidly decelerating the relative rotation while maintaining substantially the predetermined axial pressure. Torque sensing means is included to sense the torque generated at the mating surfaces which is operative upon the acceleration and deceleration means to determine when the acceleration has reached a desired value indicative of the desired melting of the mating surfaces and then to effect the deceleration.

DETAILED DESCRIPTION OF THE PREFERRED EMBODIMENT

Figure 1:
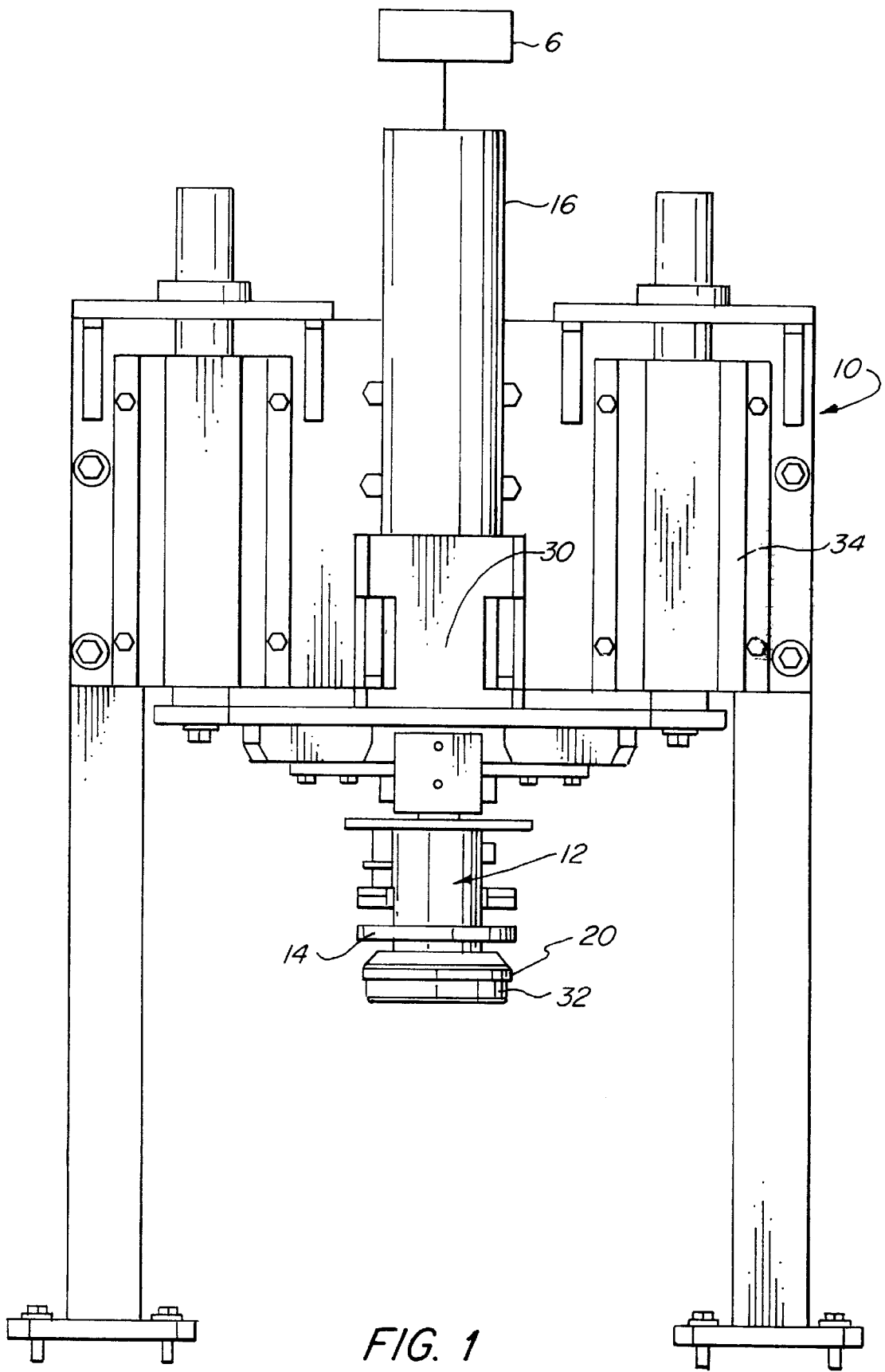
FIG. 1 is a front elevational view of the lid spinning assembly of a spin welder embodying the present invention.
Figure 2:
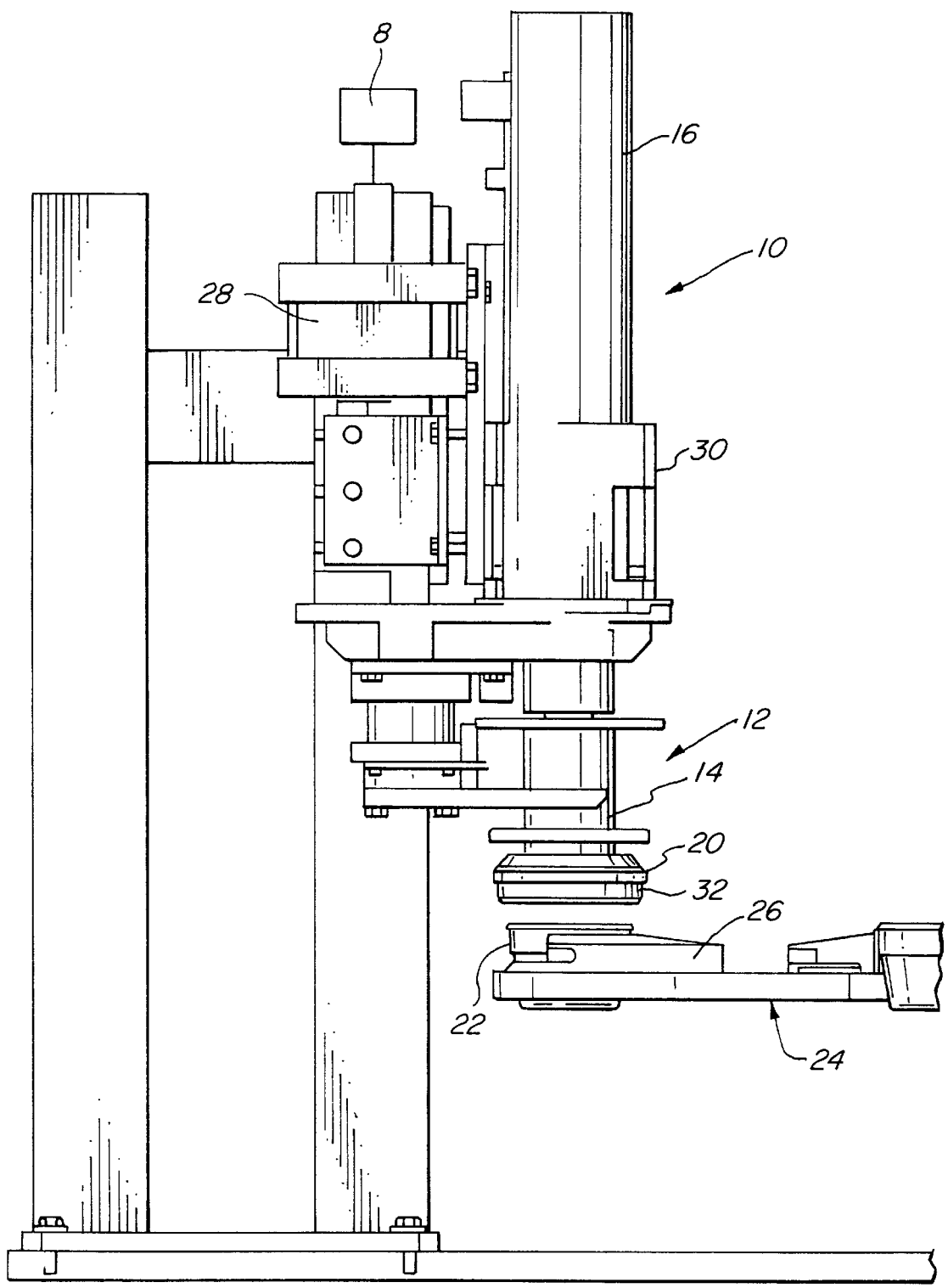
FIG. 2 is a side elevational view thereof and also fragmentarily illustrates the bowl holding subassembly.
Figure 3:
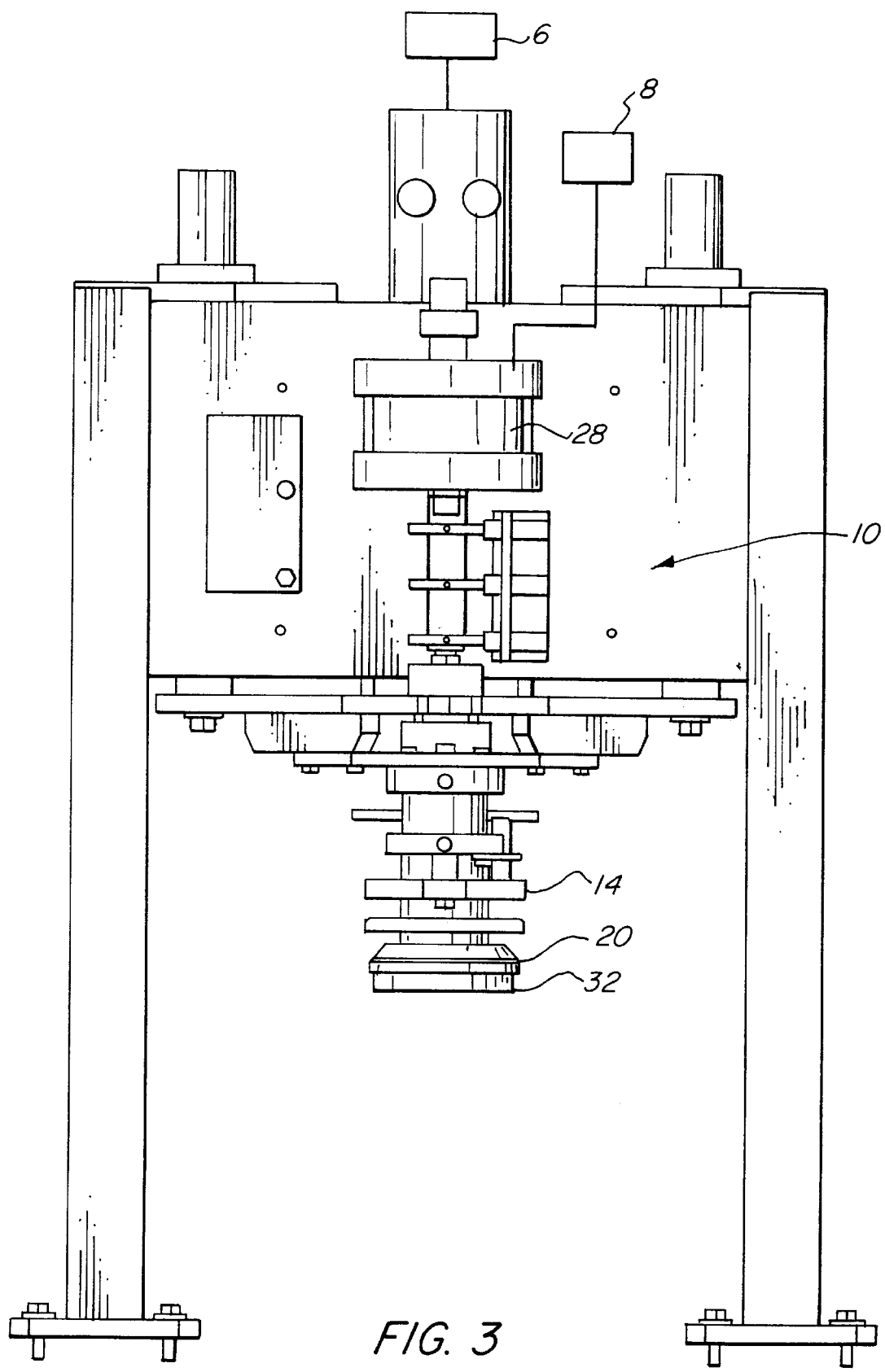
FIG. 3 is a rear elevational view of the lid spinning assembly of FIG. 1.

Turning first to FIGS. 1–3, therein illustrated is a single station spin welding machine embodying the present invention and which employs a lid supporting and spinning assembly generally designated by the numeral 10 that mounts the lid holder assembly generally designated by the numeral 12. The chuck subassembly 14 of the lid holder assembly 12 includes at its lower end the lid holder 20 in which is seated a lid 32. Rotation of the chuck subassembly 14 and lid holder 20 are effected by the servomotor 16 through the gear box 30, and the servomotor 16 and lid holder assembly 12 are vertically movable by the air cylinder/piston 28 on slides 34.

As seen in FIG. 2, a fragmentarily illustrated bowl or cup carrier generally designated by the numeral 24 has a cup holder 26 thereon in which is seated the cup 22 in alignment with the lid 32. The cup holder 26 has a multiplicity of projections or teeth (seen in FIG. 8) about its periphery to grip the cup 22 firmly therein against relative rotation.

Torque monitoring and power supply means to the servomotor 16 are indicated by the numeral 6 and control and power means for the air cylinder 28 are indicated by the numeral 8.

Figure 4:
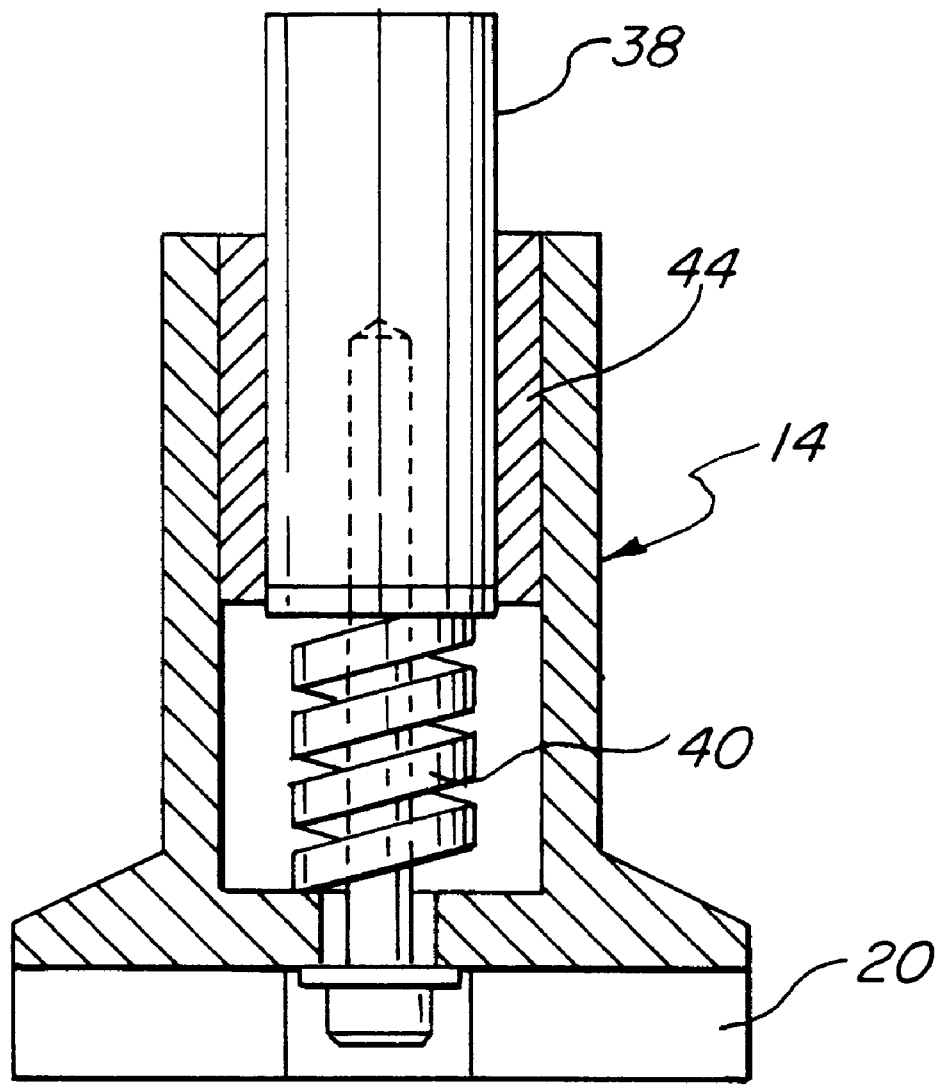
FIG. 4 is a sectional view of the chuck subassembly drawn to an enlarged scale.
Figure 5A:
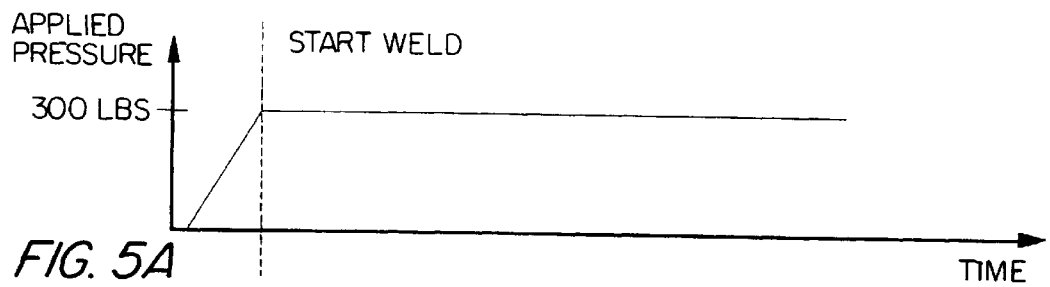
FIGS. 5A–5D are graphic representations respectively, of applied pressure, torque, velocity and rotational distance for a cup/lid assembly of different samples to a reach predetermined torque set point.
Figure 5B:
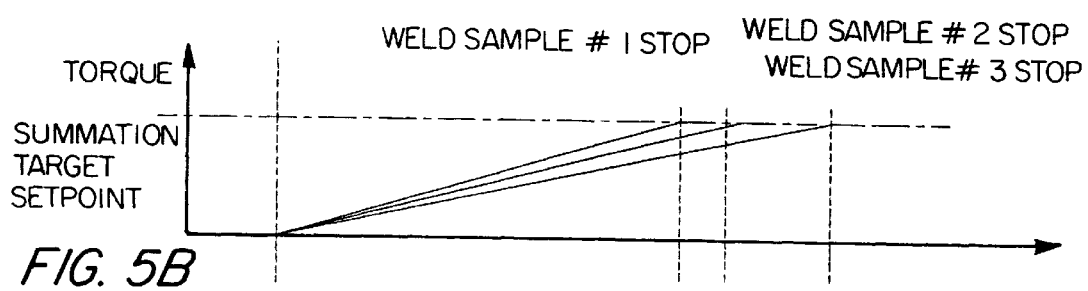
Figure 5C:
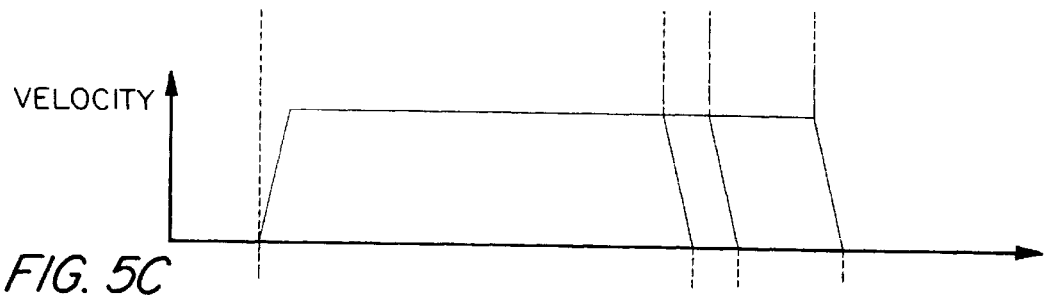
Figure 5D:
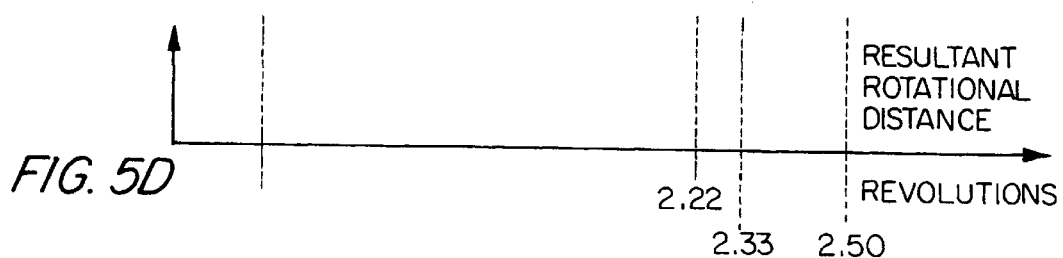
Figure 6A:
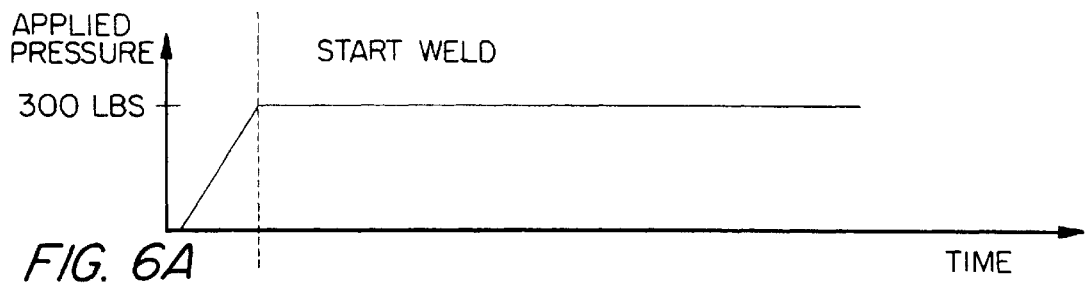
FIGS. 6A–6D are graphic representations illustrating the relationships, respectively, of applied pressure, torque, velocity and rotational distance.
Figure 6B:
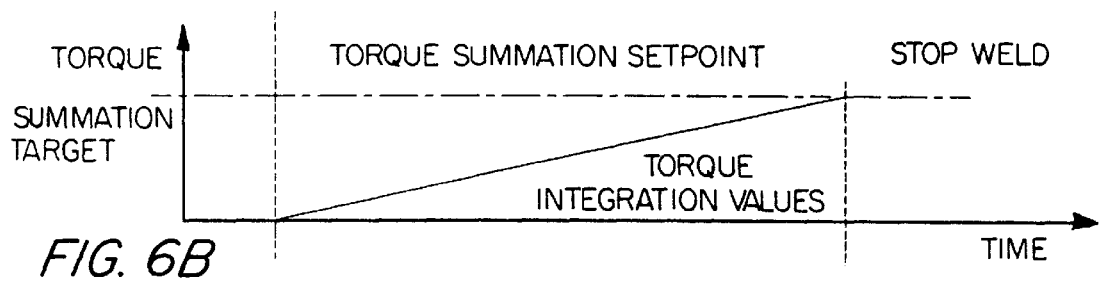
Figure 6C:
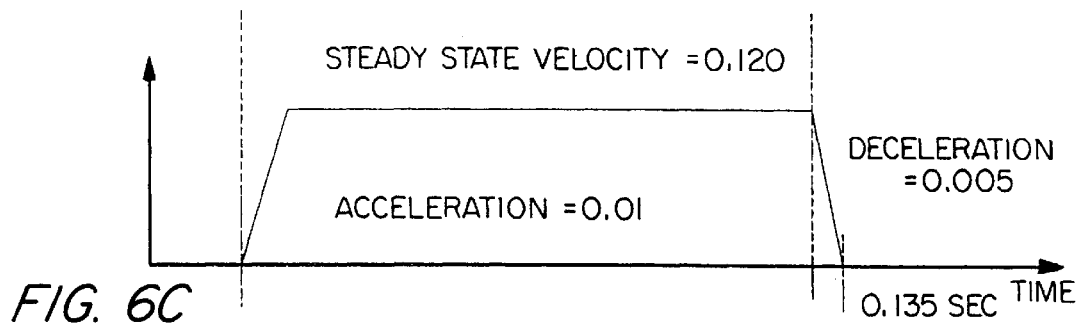
Figure 6D:
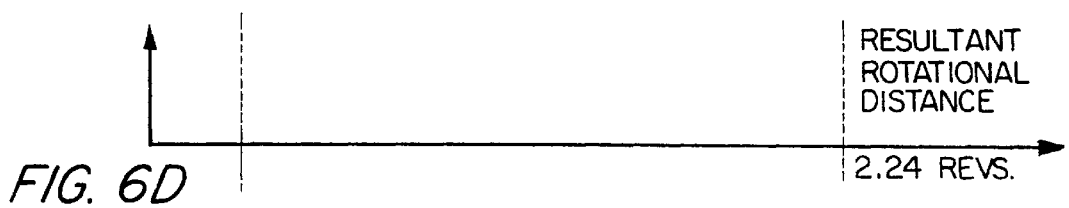
Figure 7:
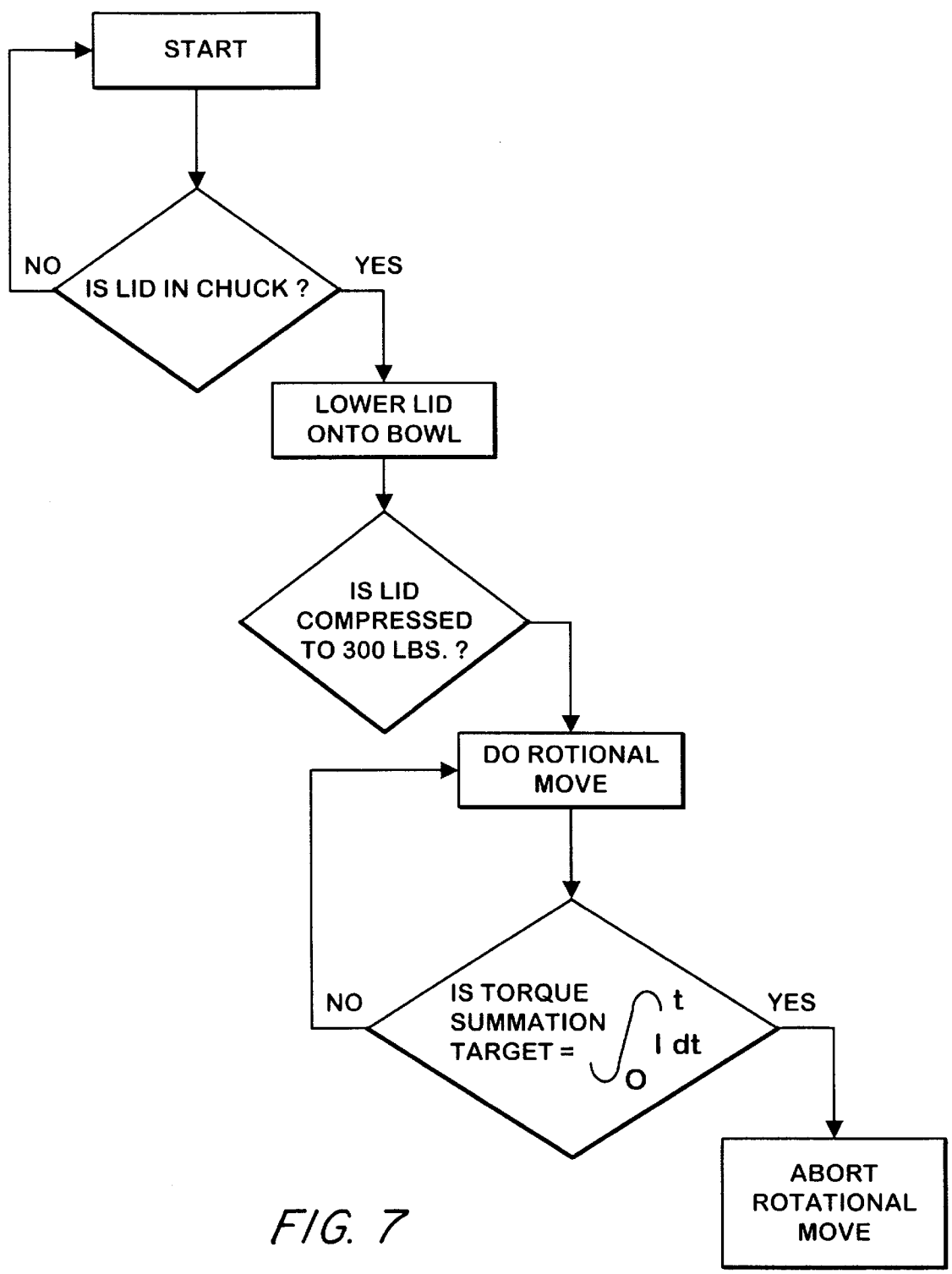
FIG. 7 is a flow chart of the logic for the spin weld cycle.

Turning next to FIG. 4, the chuck subassembly 14 is seen to include a linear bearing 44 in which the shaft 38 of the servomotor 16 is slidably seated. The shaft 38 acts upon a compression spring 40 so that, when the servomotor 16 moves the lid holder assembly 12 downwardly against the cup carrier 24, the spring 40 is compressed while the chuck 14 slides upwardly relative thereto.

Figure 9A:
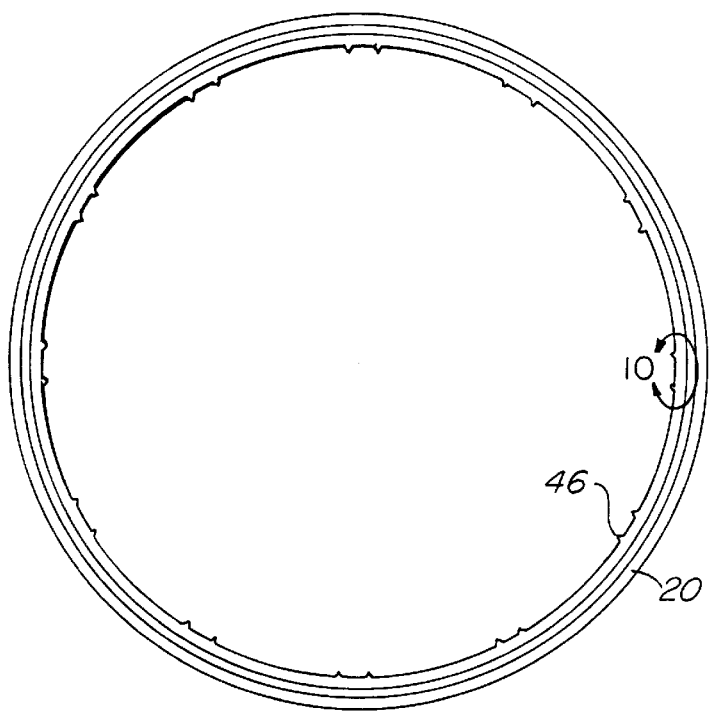
FIG. 9a is a bottom view of the lid holder.
Figure 10:
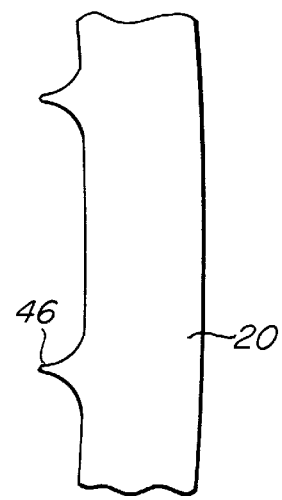
FIG. 10 is a fragmentary cross sectional view of the lid holder blade in the section designated by the broken line circle of FIG. 9 and drawn to an enlarged scale.
Figure 9B:
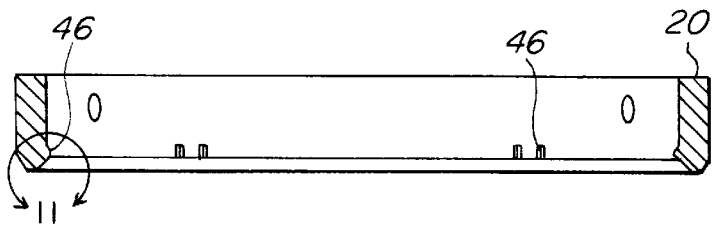
FIG. 9b is a cross sectional view of the lid holder.
Figure 11:
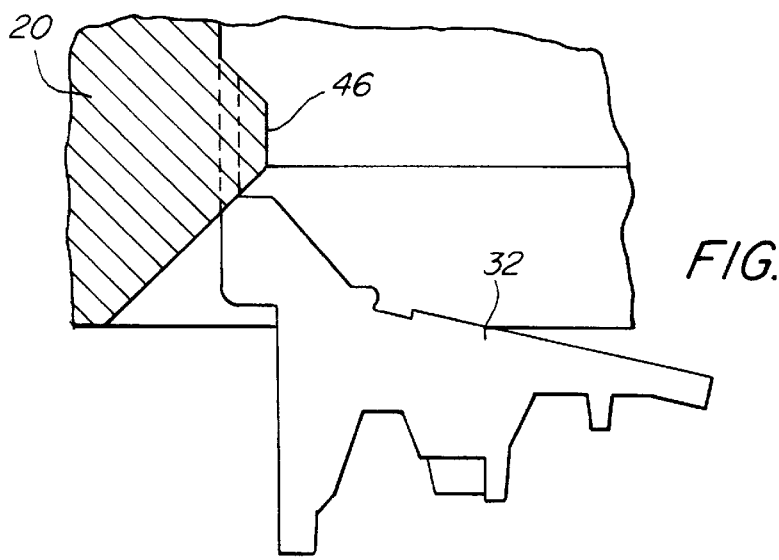
FIG. 11 is an enlarged fragmentary illustration of the blade holder and lid engaged thereby.

As seen in FIGS. 9–11, the lid holder 20 has a multiplicity of teeth or gripper blades 46 spaced thereabout which are driven into the lid 32 by the downward movement to prevent its rotation therein.

Figure 8:
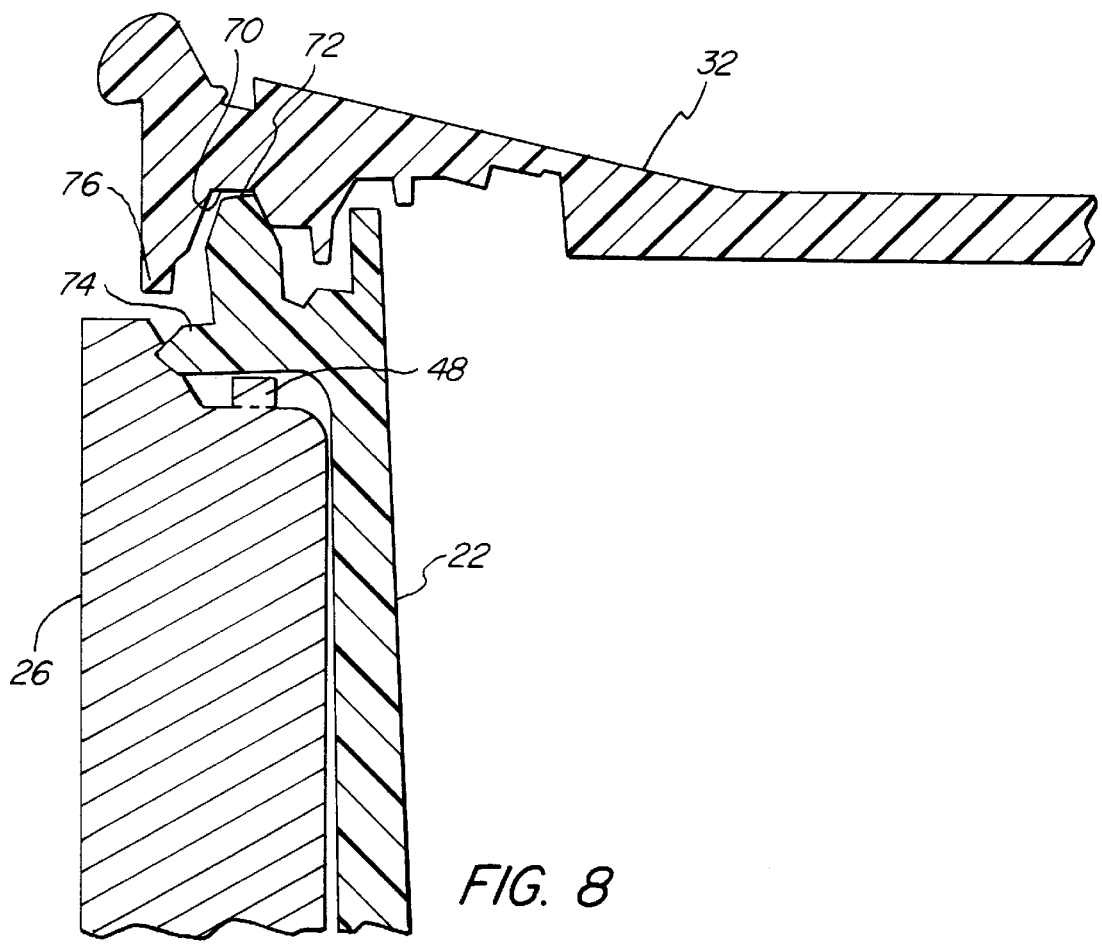
FIG. 8 is an enlarged fragmentary cross sectional view of a bowl holder, bowl and lid prior to the spin welding thereof.

As seen in FIG. 8, the cup holder 26 has teeth or gripper blades 48 spaced thereabout which are driven into the cup 22 by the pressure exerted on the upper surface thereof as the lid holder assembly 12 moves downwardly. Thus, the lid 32 and cup 22 are both restrained against rotation relative to their respective holders 20, 26.

As also seen in FIG. 8, the peripheral portions of the lid 32 and cup 22 are configured to provide a cooperating circular groove or recess 70 and a projecting circular rib 72 which extends thereinto. The cup 22 also has a circumferential flange 74 which extends outwardly of the rib 72 and cooperates with a depending circumferential flange 76 on the lid 32.

Figure 12:
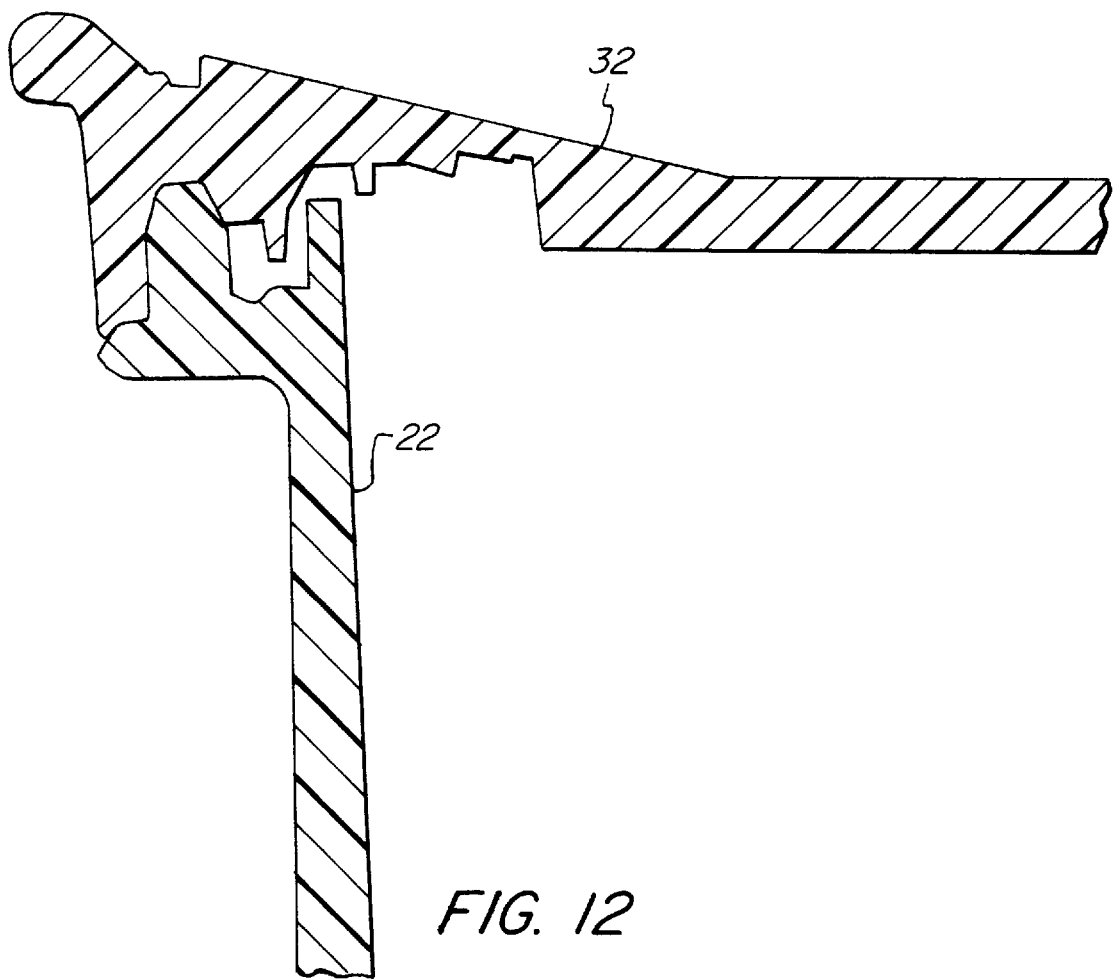
FIG. 12 is an enlarged fragmentary cross sectional view of the lid and bowl following spin welding.

The assembled container is illustrated in FIG. 12 and it can be seen that the resin in the adjacent surfaces of the lid 32 and cup 22 about the recess 70 and rib 72, and about the flange 74 and flange 76 has fused to provide a relatively large area of bonding and sealing. Any contamination on those adjacent surfaces is expressed circumferentially and any flash is blended between the opposing flanges 74, 76.

In operation of this apparatus, a cup 22 is loaded into the cup holder 26, and the lid 32 is loaded into the lid holder 20. The piston/cylinder 28 is actuated by the control 8 and moves the lid spinning assembly 10 downwardly against the cup 22 in the carrier 24. As this downward movement takes place, the gripper blades 46, 48 are embedded into the lid 32 and cup 22, and the spring 40 is compressed to provide the desired biasing force.

The servomotor 16 is actuated by the control 6 to effect relative rotation of the lid 32 relative to the cup 22 until the desired torque is reached at which time the control 6 rapidly decelerates the servomotor 16 and relative rotation to produce the desired welding of the opposing surfaces of the lid 32 and cup 22.

The desired parameters of the process will be discussed in detail hereinafter.

Figure 13:
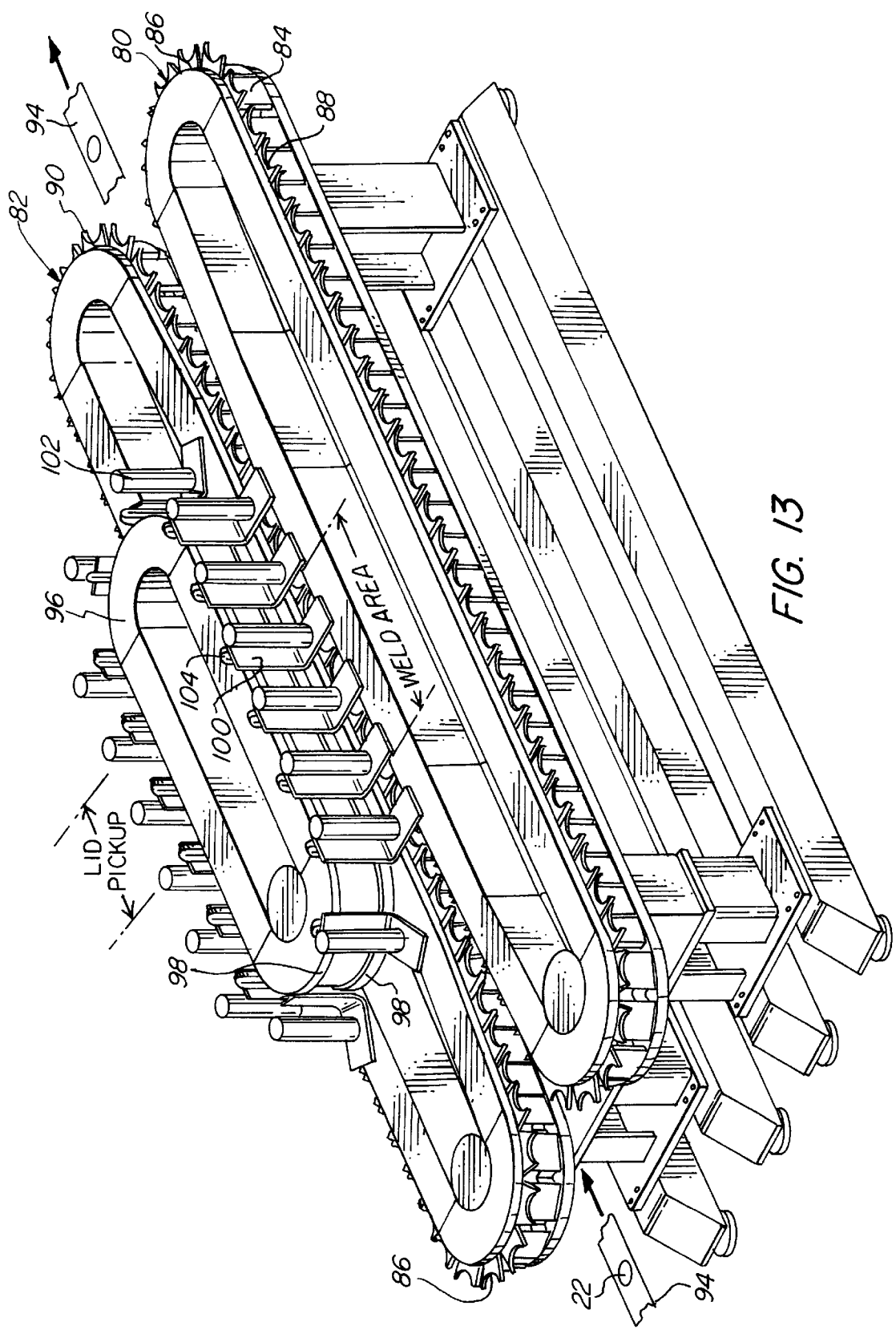
FIG. 13 is a partially diagrammatic perspective illustration of a production unit for spin welding containers.
Figure 14:
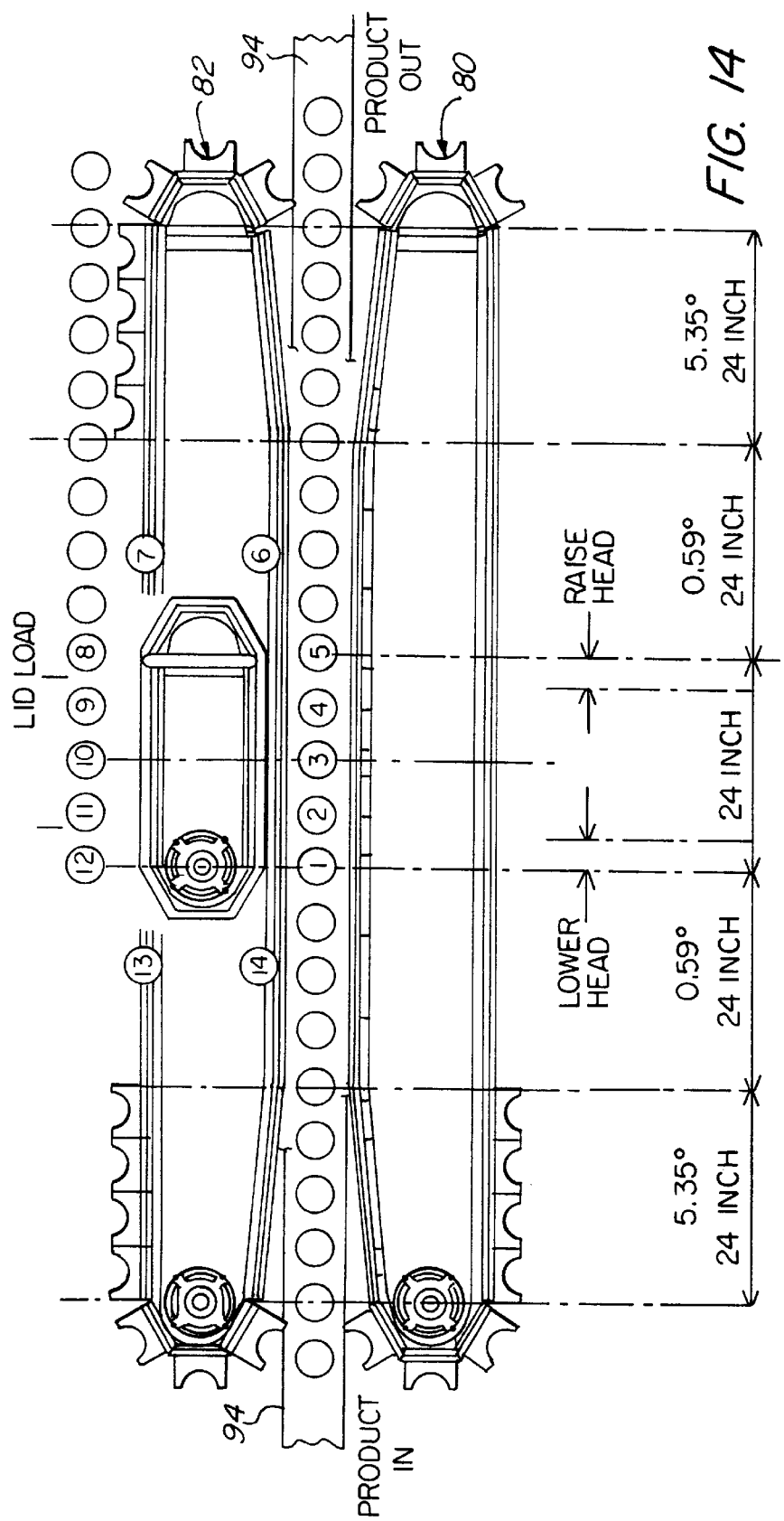
FIG. 14 is a diagrammatic plan view of the production unit of FIG. 13.

Although the apparatus described hereinbefore is suitable for low volume productions and testing of materials and configuration, FIGS. 13 and 14 diagrammatically illustrate a high speed packaging installation provided by a cooperating pair of belt drive units generally designated by the numerals 80, 82. The unit 82 has a single drive belt 84 which has cup holder elements 86 thereon providing a semi-circular recess 88. The unit 82 has a first drive belt 90 with cooperatively configured cup holder elements 86 thereon, and the belts 84, 90 are synchronously driven by a gear (not shown). As can be seen, the drive paths of the belts 84, 90 are elongated with arcuate ends. The belts 84, 90 initially converge from the intake end to bring the cup holder elements 86 into abutting relationship, travel parallel through the central spin welding area, and then diverge at the unloading end.

A conveyor belt 94 extends between the units 80, 82 below the cup holder elements 86 and conveys the cups 22 into the space between the cup holder elements 86 on the belts 84, 90. As the belts 84, 90 converge, the holder elements 86 firmly grip the cups 22 between them, and the conveyor belt 94 then desirably descends slightly so that the cups 22 are supported only in the holder elements 86 as they pass through the welding station. Thereafter, the conveyor belt 94 ascends to support the welded containers which are released by the holder elements as the belts 84, 90 diverge towards the discharge end of the installation.

The unit 82 has a turret 96 with a second drive belt assembly 98 which is synchronously driven with the belts 84, 90, and it carries the brackets 100 upon which are mounted the servomotors 102 and which are slidable on the vertical posts 104 by action of cams (not shown) at the entrance and exit ends of the welding area. The lids (not shown) are inserted into the lid holders (not shown) on the side of the belt path opposite the welding area.

As in the prior single station embodiment, the motor 102, clutch and lid holder containing the lid (all not shown) are moved downwardly by a cam (not shown) at the beginning of the welding area to load the spring and embed the gripper blades in the cup and lid, and a short burst of rotation of the motor 102 produces the spin weld of the opposing surfaces.

As is conventional, the cups or bowls are filled with the product prior to movement on the conveyor belt into the spin welding installation.

As indicated hereinbefore, the method of the present invention is one which involves the rapid acceleration of relative rotation of the lid and disc after they have been brought into contact and are under axial pressure which is maintained during the spin welding operation. The torque generated (indicated by the power being drawn) by the motor producing the rotation is monitored to determine when it reaches a plateau and the rotation continues for a short time thereafter, following which the motor and rotation are rapidly decelerated. As will be appreciated, this torque will increase until the opposing surfaces melt and reduce the frictional drag. This ensures that the spin weld cycle lasts only for the time required to obtain sufficient melting to produce a good bond.

Figure 15:
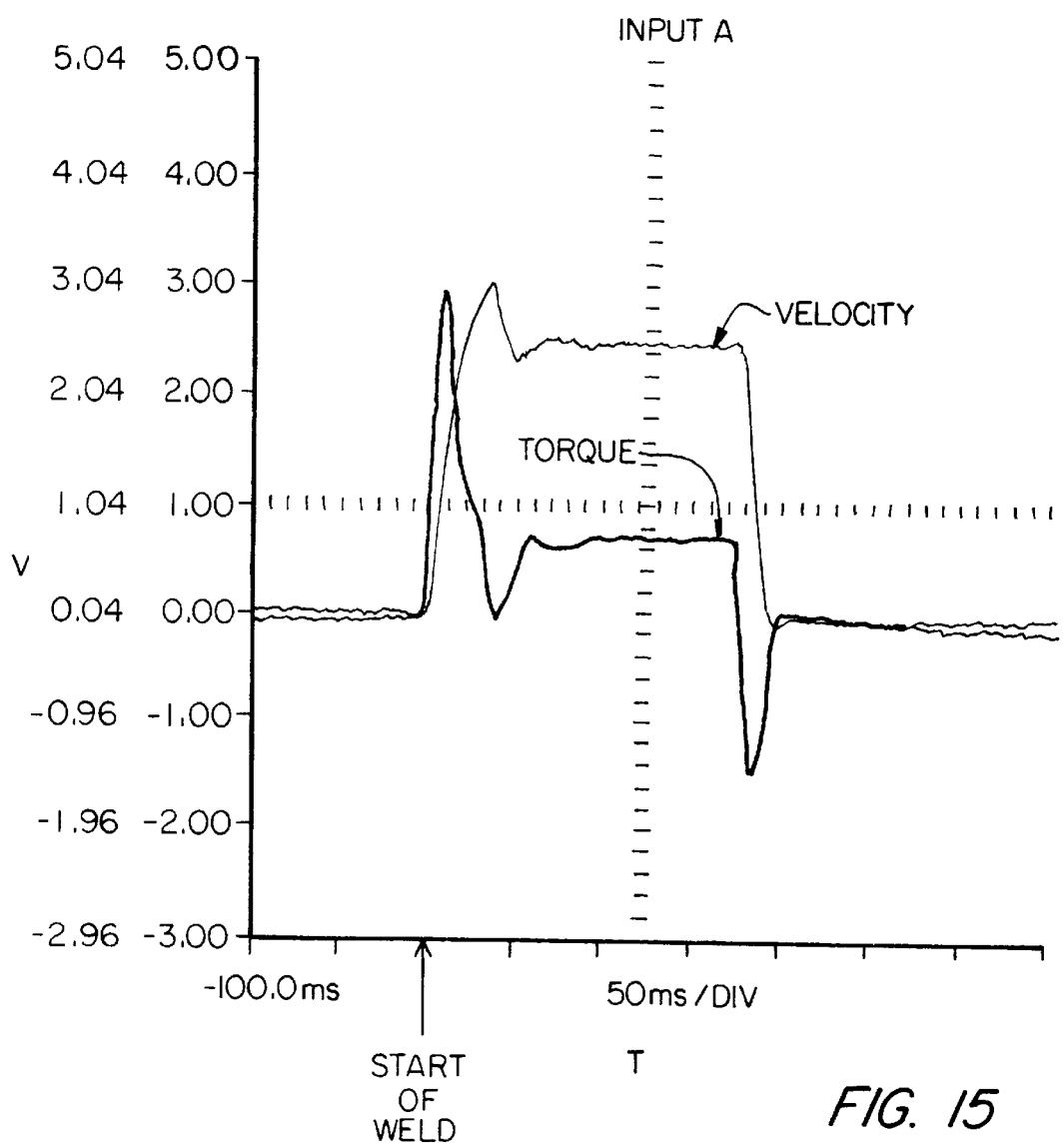
FIG. 15 is a graphic representation of velocity and torque during the spin welding operation.

As can be seen in FIG. 15, there will be an initial spike as the motor overcomes inertia after which the power requirement drops down and thereafter climbs to a plateau as the resin melts. The rotation is continued for a short period after reaching the plateau, usually at least 50 milliseconds, to ensure thorough melting and expression of any contamination on, the opposing surfaces. Continuation time periods greater than 100 milliseconds really provide no significant benefit and may be detrimental.

During the spin weld cycle, the axial pressure on the opposing surfaces is maintained by the compression spring as the surfaces melt and flow, and this ensures the desired rapid and substantially uniform fusion. This axial pressure should be at least 100 p.s.i. and is preferably in the range of 200–500 p.s.i.

The motor and its controller must effect rapid acceleration and deceleration at a rate of 35,000–250,000 rpm/sec. This can be effected by the motor directly or through appropriate gear drive.

With the present process using axial pressure as described above, contamination on the surfaces to be bonded will be expressed outwardly, and flash is preferably confined by providing a pair of cooperating circumferential flanges as illustrated.

FIGS. 5A–5D illustrate the variation in revolutions for three different specimens to reach the desired plateau in torque while applying the same pressure and rate of acceleration and deceleration.

FIGS. 6A–6D illustrate the relationship between applied pressure, torque, velocity, acceleration, deceleration and rotational distance for a specimen cup and lid having a diameter of 3 7/16 inches and fabricated from a polypropylene/polyethylene resin and having a configuration substantially as seen in FIG. 8.

Although either the lid or the cup may be rotated, the lid is preferred because of lesser inertia and the tendency for the contents of the cup to be violently agitated by the rapid acceleration and deceleration The term "cup" as used herein include cups, bowls, bottles and other containers of generally circular cross section.

The computer control for the spin welding assembly easily effects and synchronizes the several motions and cycles. Monitoring of the power demand is easily effected by an ammeter in the circuit to the motor, and the biasing force can be measured by a load cell. Movement of the lid assembly towards and away from the cup can be effected by hydraulic or pneumatic piston/cylinder units, or by mechanical action using cams and the like.

If so desired, the spin welding installation may include a series of nozzles to direct steam about the filled cup prior to the welding station so that steam fills the headspace in the container when the lid is sealed. When the steam condenses, a vacuum is formed in the container.

For some applications, it may be desirable to provide a controlled atmosphere in the headspace. As is known, providing a gas in the headspace will reduce the time required to cook the contents of the container after the lid is sealed. In a rotating cooker, this bubble will also agitate the contents to reduce the time required. By using steam and nitrogen injection prior to sealing, nitrogen can be included in the headspace, and it is inert to the contents.

Thus, it can be seen from the foregoing detailed description and attached drawings that the novel spin welding process of the present invention is rapid, efficient and accommodating of variations in surface characteristics of the mating surfaces and of contamination thereof. The method can be practiced in high speed lines which can be fabricated and operated at reasonable cost.

Having thus described the invention what is claimed is:

1. The method of making sealed synthetic resin containers comprising:
    (a) molding thermoplastic synthetic resin into bowls and lids therefor, said lid and bowl having substantially complimentary mating surfaces extending about the periphery thereof;
    (b) filling one of said bowls with product;
    (c) bringing opposed, generally horizontal mating surfaces of said lid and bowl into contact under a predetermined axial pressure while gripping said product filled bowl and lid securely;
    (d) rapidly accelerating rotation of said lid relative to said bowl while maintaining substantially said axial pressure to produce melting of said mating surfaces until a desired torque value is attained; and
    (e) then immediately decelerating said rotation of said lid to terminate said rotation and allow said mating surfaces to bond.

2. The method of making sealed synthetic resin containers in accordance with claim 1 wherein said rotation is effected at a high degree of acceleration and said termination of rotation is effected at a high degree of deceleration.

3. The method of making sealed synthetic resin containers in accordance with claim 1 wherein torque is monitored repeatedly during said step of accelerating rotation until a plateau is reached and said rotation step is continued for at least 50 milliseconds thereafter.

4. The method of making sealed synthetic resin containers in accordance with claim 3 wherein said monitoring of said torque is effected by monitoring the power being drawn by a motor used for producing the accelerating rotation.

5. The method of making sealed synthetic resin containers in accordance with claim 1 wherein said predetermined axial pressure is 200–500 p.s.i.

6. The method of making sealed synthetic resin containers in accordance with claim 1 wherein said acceleration and termination of rotation is effected in less than four relative rotations of said lid relative to said bowl.

7. The method of making sealed synthetic resin containers in accordance with claim 2 wherein said acceleration is at a rate of 35,000–250,000 rpm/sec.

8. The method of making sealed synthetic resin containers in accordance with claim 2 wherein said deceleration is at a rate of 35,000–250,000 rpm/sec.

9. The method of making sealed synthetic resin containers in accordance with claim 1 wherein there is included the step of directing steam onto said mating surface of said bowl prior to bringing said lid into contact therewith.

10. The method of making sealed synthetic resin containers in accordance with claim 9 wherein nitrogen is admixed with said steam.

11. The container spin welding apparatus in accordance with claim 9 wherein a partial vacuum is produced in sealed container.

12. Apparatus for producing spin welded containers comprising:
    (a) a holder for firmly gripping a bowl;
    (b) a holder for firmly gripping a complimentary lid;
    (c) means for moving said holders relative to each other to bring mating surfaces into contact;
    (d) pressure applying means for applying predetermined axial pressure on the mating surfaces;
    (e) acceleration and deceleration means for rapidly accelerating rotation of the holders relative to each other and for rapidly decelerating said relative rotation while maintaining substantially the predetermined axial pressure; and
    (f) torque sensing means for sensing the torque generated at the mating surfaces and is operative upon said acceleration means to determine when the acceleration has reached a desired value indicative of the desired melting of the mating surfaces to effect said deceleration.

13. The container spin welding apparatus in accordance with claim 12 wherein said torque sensing means senses the current drawn by the acceleration and deceleration means during acceleration until a plateau is reached.

14. The container spin welding apparatus in accordance with claim 12 wherein said predetermined axial pressure is 200–500 p.s.i.

15. The container spin welding apparatus in accordance with claim 12 wherein said acceleration and termination of rotation is effected in less than four relative rotations of the lid relative to the bowl.

16. The container spin welding apparatus in accordance with claim 12 wherein said acceleration is at a rate of 35,000–250,000 rpm/sec, and wherein said deceleration is at a rate of 35,000–250,000 rpm/sec.

17. The container spin welding apparatus in accordance with claim 12 wherein there is included means for directing steam onto the mating surface of the bowl prior to bringing said lid into contact therewith.

18. The container spin welding apparatus in accordance with claim 17 wherein there is included means for admixing nitrogen with the steam.

* * * * *